United States Patent [19]

Goodman et al.

[11] Patent Number: 5,972,263
[45] Date of Patent: Oct. 26, 1999

[54] PROCESS FOR PRODUCING CLAY COMPOSITIONS FOR USE IN SLIP CASTING

[75] Inventors: Howard Goodman, St Austell; Christopher Stirling Hogg, Luxulyan; Richard Gerrard Shaw Stewart, St Austell, all of United Kingdom

[73] Assignee: ECC International Ltd., United Kingdom

[21] Appl. No.: 08/988,309

[22] Filed: Dec. 10, 1997

Related U.S. Application Data

[63] Continuation-in-part of application No. 08/662,177, Jun. 12, 1996, abandoned.

[30] Foreign Application Priority Data

Jun. 13, 1995 [GB] United Kingdom .................. 9512005

[51] Int. Cl.$^6$ ........................... C04B 33/04; C04B 33/28
[52] U.S. Cl. ........................... 264/86; 106/486; 106/487; 106/DIG. 4; 501/141; 501/143; 501/144; 501/145; 501/148; 524/253; 524/275; 524/299; 524/446; 524/447
[58] Field of Search ........................... 501/141, 144, 501/143, 148, 145; 106/486, 487, DIG. 4; 524/447, 253, 275, 299, 446; 264/86

[56] References Cited

U.S. PATENT DOCUMENTS

| 4,148,662 | 4/1979 | Hughes et al. .............................. 106/67 |
| 4,294,635 | 10/1981 | Hurley, Jr. . |
| 4,915,890 | 4/1990 | Koblinski .................................. 264/86 |
| 5,153,155 | 10/1992 | Kohut ..................................... 501/141 |

FOREIGN PATENT DOCUMENTS

| 3211083 | 9/1983 | Germany . |
| 1481307 | 7/1977 | United Kingdom . |
| 2093007 | 8/1982 | United Kingdom . |
| 2285766 | 7/1995 | United Kingdom . |
| WO89/02355A1 | 3/1989 | WIPO . |

OTHER PUBLICATIONS

WPI Abstract Accession No. 75–07666W/05 & DE2331263A (Inst Ind Sticlei Ceramic) Jan. 23, 1975 (see attached abstract) .

Primary Examiner—James Derrington
Attorney, Agent, or Firm—Suzanne Kikel

[57] ABSTRACT

A method of improving the strength and/or plasticity of a clay composition comprising a kandite clay and an organic additive comprising at least one water soluble compound having a plurality of basic groups wherein the organic additive is present in an amount of from about 0.05% by weight to about 0.5% by weight based on the dry weight of the kandite clay present, which method comprises treating the kandite clay by adding thereto a monovalent ion activated smectite clay or a monovalent ion activating agent for a smectite clay or both whereby the amount of monovalent ion activated non-calcined smectite clay present in the clay composition is adjusted to be in the range from about 1% by weight to about 5% by weight based upon the dry weight of the kandite clay present.

11 Claims, No Drawings

PROCESS FOR PRODUCING CLAY COMPOSITIONS FOR USE IN SLIP CASTING

CROSS-REFERENCE TO RELATED APPLICATIONS

This Application is a continuation-in-part of U.S. patent application Ser. No. 08/662,177 filed Jun. 12, 1996 now abandoned.

BACKGROUND OF THE INVENTION

This invention relates to slip casting, and is more particularly concerned with a new clay composition for use in slip casting, a slip casting composition incorporating the same and a slip casting method using such a slip casting composition.

The process of slip casting is widely used in the traditional ceramic industries of sanitary ware and tableware, to fabricate items of complex shape that are difficult to make by other methods.

In the slip casting process, a slurry or slip is prepared from a mixture of suitable raw materials, usually china clay (a kaolinitic clay), ball clay, quartz and feldspar. The slurry is dispersed at a solids content typically in the range 70–75 wt % (approximately equivalent to slip densities of 1750–1850 $g.dm^{-3}$), and deflocculants (dispersants) are added during dispersion to control the rheological and casting properties of the slip.

The slip is then poured into a mold which is normally made of plaster of paris, and allowed to remain in the mold for a period of time depending on the thickness of cast required, the temperature and rheological properties of the slip and the nature of the raw materials. For tableware, where pieces need only be 2–3 mm thick, the casting time may be between 5 and 15 minutes. For sanitary ware, where cast thickness of about 9 mm are required, the casting time may be between 45 and 90 minutes.

During the casting period, water is sucked out of the slip by the capillary action of the mold, and a skin or cast of clay body is formed on the inner surface of the mold. After the required thickness of cast has been built up, the remaining slip is drained off and the cast is allowed to dry for a period of time before the mold is opened and the case removed. For tableware this drying period may be less than one hour, but for sanitary ware it can be several hours.

The manufacture of sanitary ware by slip casting is a relatively slow process. In many factories, only one cast per day is obtained from each mold, and even in factories that have automated systems for speeding up cast and mold drying, rarely are more than two casts per mold per day achieved. This means that many molds have to be used in order to reach an adequate level of production, and the process is quite labour intensive.

It has always been a long term objective of the sanitary ware industry to speed up the casting process, and hence improve productivity and reduce costs. There are several ways to increase the casting rate of a slip.

The rheology of the slip can be changed to increase the slip thixotropy ie. the time dependent increase in viscosity. This results in an increase in cast permeability and moisture content. However, increasing the thixotropy of the slip can also result in problems with slip drainage at the end of the casting period, and can give soft flabby casts that distort or collapse when removed from the mold, or which crack during drying.

Increasing the temperature of the slip will increase the casting rate, but too high a slip temperature may result in excessively fast drying and cracking of the cast pieces.

Increasing the slip density may also increase the casting rate under certain conditions, but this is not infallible. Increasing the slip density usually results in a decrease in cast porosity and hence permeability, counteracting any potential increase in casting rate. The slip rheology will also change, leading to problems with drainage after casting, and general slip handling in the factory.

Applying a pressure to the slip increases the casting rate in proportion to the applied pressure. 'Pressure casting' as it is known, is a fairly recent manufacturing process that is becoming more popular, although the capital cost of the equipment is high. The method is commonly limited to simple two piece molds such as wash basins, and traditional plaster casting has still to be used for many items, notably closets.

The most common method adopted for increasing casting rate is by changing the types or proportions of clay in the body to give a more permeable cast. The total amount of clay in the recipe can be reduced, or the amount of ball clay can be reduced relative to the amount of kaolin or china clay, or coarser china clays or ball clays can be substituted. These types of recipe alteration invariably result in a decrease in cast strength and cast plasticity, leading to an increase in cracks during trimming and drying, and breakages when handling. Thus any increase in overall output due to faster casting may be offset to some degree by an increase in losses.

Whatever the method of formation, all cast pieces are subject to the same processing after casting. This means that they have to withstand the same trimming, handling and glazing processes, and so have to have the same plasticity and strength before firing. Unfired vitreous sanitary ware has a strength approximately in the range 1.25–1.65 MPa when conditioned in an atmosphere of 80% relative humidity, or 2.5–3.3 MPa when dried at 110° C. It is therefore important that a minimum conditioned strength of 1.25 MPa be maintained, independent of any changes in casting rate that might be achieved by alteration of the clays or casting process.

SUMMARY OF THE PRIOR ART

Various prior art documents describe compositions useful in the slip casting of ceramic articles and the manufacture of such compositions. U.S. Pat. No. 5,153,155 (Kohut) describes the production of slurry compositions for such use. The slurry is made by blending with an anionic polyelectrolyte a ball clay/water mixture together with a kaolin clay/water mixture. The kaolin clay used is described as being 'unique' because of its unusual composition. It is said to contain various ingredients in addition to kaolin including from 0.5 to 3 weight per cent of montmorillonite. It is stated that the blended slurry may contain up to 8 per cent by weight of montmorillonite and the specific ball clay used in the specific examples contains in fact 7.78 per cent by weight of montmorillonite. U.S. Pat. No. 5,153,155 contains no teaching of the form in which these montmorillonite contents must be present or, indeed, why the montmorillonite should be present. It appears that the specific kaolin clay and ball clay which have been employed to produce the mixed slurries described in U.S. Pat. No. 5,153,155 happen to contain together a substantial amount of montmorillonite. This is contrary to accepted general practice wherein it is usual for the kandite clays (kaolin and/or ball clays) used in the slip casting industry not to contain a significant amount of montmorillonite (eg. more than about 1 per cent by weight; usually the montmorillonite content of such kandite clays is not more than about 0.5 per cent by weight).

Thus, the mixed clay employed to produce slurries in U.S. Pat. No. 5,153,155 is considered to be unusual and is not to be regarded as a conventional slip casting clay blend.

In contrast, the present invention is aimed at improving the properties of what may be considered as a more conventional slip casting clay, including a kaolin clay or a kaolin clay/ball clay blend, especially one which contains only small amounts of montmorillonite.

GB-A-1481307 discloses a process for reducing the viscosity at a given solids content of an aqueous suspension of a kandite clay mineral in which the clay mineral is treated with a minor proportion by weight of a water-soluble cationic organic compound, viz an organic compound having a plurality of basic groups and a number average molecular weight not greater than 1000. It is stated that, using a clay mineral prepared by such a process, an aqueous suspension of the mineral will form a cake of high permeability to water during a filtration operation so that the rate at which the aqueous suspension may be dewatered by filtration is increased. EP-A-0334950 (U.S. Pat. No. 5,034,448) applies the teaching of GB-A-1481307 to the art of slip casting, whereby the casting rate of a kandite clay composition is improved by the addition of certain organic compounds of the above type.

When a kandite clay is modified by addition of a cationic organic compound to improve its casting rate, its strength and/or plasticity is likely to be reduced. This can result in cracking or drying and fettling and breakages on handling when ceramic products are made by slip casting using such modified clay.

It is an object of the present invention to provide a method of improving the strength and/or plasticity of a kandite clay to be used in slip casting in a composition to which a cationic organic compound is added for casting rate improvement. It is a further object of the present invention to provide a novel kandite clay composition, especially a kaolin clay composition, for use in the aforementioned method.

It is still a further object of the present invention to provide a novel additive composition for adding to kandite clay such as kaolin clay for use in the aforementioned method.

SUMMARY OF THE PRESENT INVENTION

According to the present invention there is provided a method of improving the strength and/or plasticity of a clay composition for use in slip casting and comprising a kandite clay and an organic additive comprising at least one water soluble compound having a plurality of basic groups wherein the organic additive is present in an amount of from about 0.05% by weight to about 0.5% by weight based on the dry weight of kandite clay present, which method comprises treating the kandite clay by adding thereto a monovalent ion activated smectite clay or a monovalent ion activating agent for smectite clay or both whereby the amount of monovalent ion activated non-calcined smectite clay present in the clay composition is adjusted to be from about 1% by weight to about 5% by weight based on the dry weight of kaolin present. The smectite clay or monovalent ion activating agent for smectite clay or both may be added to the kandite clay before, during or after addition thereto of the said organic additive.

DESCRIPTION OF THE INVENTION

We have found unexpectedly and beneficially that by adjusting the amount of monovalent ion activated smectite clay present with kandite clay to be in the range of from about 1% to about 5% by weight based on the dry weight of the kandite clay a suitably improved combination of casting rate, strength, and plasticity is obtained as demonstrated later in this specification, when the kandite clay is incorporated together with a cationic organic additive in a slip casting composition.

Although smectite clay (montmorillonite) is present in the slurries produced as described in U.S. Pat. No. 5,153,155, such clay appears to be present because it is, unusually, a significant natural constituent of the kandite clays employed. Natural sources of smectite clays are usually in the form of divalent ion smectites, eg. calcium smectites, since divalent ions are abundantly available in the earth's geological structures. There is no teaching in U.S. Pat. No. 5,153,155 that by adjusting the amount of monovalent ion activated smectite present in a kandite clay to be employed in slip casting together with a cationic organic additive that a superior combination of casting rate, strength and plasticity can be obtained. In any event, because the slurries described in U.S. Pat. No. 5,153,155 contain an anionic dispersing agent they would be unsuitable for addition to a cationic organic casting rate improving additive in the manner described in EP-A-0334950 (U.S. Pat. No. 5,034,448) because by such addition they would form unwanted flocs and so the method of the present invention, which concerns improvement of strength and/or plasticity of a kandite clay-containing composition in which a cationic casting rate improving organic additive is added, is not suggested by U.S. Pat. No. 5,153,155.

The kandite clay employed in the method according to the present invention may have a natural smectite clay content of less than 1% by weight, often less than 0.5% by weight based on the dry weight of the kandite clay.

The monovalent ion activated smectite clay content of such a kandite clay may be adjusted to be in the said range of about 1% (where originally less than 1%) to about 5% by addition to the kandite clay of a suitable amount of a monovalent ion activated smectite. Alternatively, or in addition, where the smectite clay is naturally present in the kandite clay as a divalent ion smectite in an amount of between about 1% and about 5% or more, an activating agent may be added to the smectite in a suitable amount to convert an appropriate amount to a monovalent ion activated form.

The divalent ion form may for example comprise a calcium smectite. A suitable monovalent ion activated form may comprise a sodium activated smectite. Conversion of a divalent ion smectite to a monovalent ion smectite is known per se and examples of such conversions are given later in this specification.

Smectites are sheet silicates with a high cation exchange capacity arising from charge imbalance due to substitutions within the crystal lattice. This charge imbalance is compensated by cations adsorbed from solution, known as exchangeable ions because they can easily be exchanged with ions of a different type. For most naturally occurring smectites, the exchangeable ion is calcium, a divalent cation.

In water, those smectites with calcium cations disperse to a lesser degree than those with sodium cations. This is due to the greater effect of the divalent calcium cation in compressing the so-called electrostatic double layer around the particles that causes them to repel each other, compared with the monovalent sodium cation.

Monovalent ion smectites such as sodium exchanged smectites are relatively easily dispersed in water to give individual plates or crystallites, while the calcium smectites tend only to disperse to "packets" of three or four crystallites. Sodium smectites are generally more effective in whatever application they are used for.

It is a relatively simple matter to convert a divalent ion, eg. calcium, smectite to a monovalent ion, eg. sodium, smectite, by adding a small amount of a suitable salt containing the monovalent ion, eg. sodium carbonate, typically about 4–5% by weight. When dispersed in water, the exchangeable calcium ions are precipitated as calcium carbonate and the sodium ions become the exchangeable ions. The smectite is then said to be "sodium activated". However, the term "activated" should be used with caution, as smectites can also be "acid activated" for use in decolorising vegetable oils, which is an entirely different activation process.

In the present invention, the smectite clay is present in the slip casting composition formed from the kandite clay composition in a minor amount, ie. less than about 2%, although typically more than about 0.05% by weight of the slip casting composition. The smectite clay is typically a montmorillonitic clay such as a bentonite, and preferably has sodium as the predominant monovalent exchangeable cation. Such a clay can be prepared for example by activating a calcium bentonite with sodium carbonate. Other smectite clays such as hectorite and saponite may be suitable in the present invention.

The water-soluble organic compound(s) used to provide the said organic additive will normally have a number average molecular weight no greater than 10,000. It is also preferably a polyalkylene polyamine (or an alkylene amine). Examples of suitable polyalkylene polyamines which may be used in the present invention can be found in EP-A-334950. Preferred polyalkylenes are the polyethylene imines (PEI) and the polyethylene amines (PEA). Mixtures of water-soluble organic compounds are also contemplated. Typically, the polyethylene imine has a number average molecular weight no greater than 10,000, and preferably in the range 600 to 5000. A preferred polyethylene imine is LUPASOL FC which has a number average molecular weight of 1000, made by BASF. The PEA preferably has a number average molecular weight no greater than 700, and preferably in the range 100 to 500. A preferred polyethylene amine is E-100 having a number average molecular weight of 309 made by the Dow Chemical Company.

According to the present invention in a second aspect there is provided a clay composition, herein Composition A, for use in slip casting which comprises:

a) a major amount of at least one kandite clay;
b) a minor amount of an organic additive comprising at least one water-soluble compound having a plurality of basic groups; and
c) a minor amount of at least one non-calcined smectite clay in a monovalent ion activated form.

In the said composition A, the strength and/or plasticity of the kandite clay modified by the organic additive is increased in the manner described hereinbefore by addition or inclusion of the said activated smectite clay.

In the said composition A, the kandite clay(s) may form at least 92%, eg. 95% to 99%, by weight, of the said composition.

In the said composition A, the weight ratio of the said smectite clay or clays to the organic additive is preferably in the range of from 3:1 to 30:1, especially from 10:1 to 20:1.

For example, suitable examples of composition A may be formed using from 1% to 5%, eg. 2% to 4%, by weight of added monovalent ion activated smectite clay and from 0.05% to 0.5%, eg. from 0.1% to 0.2% by weight, of the said organic additive the balance being the kandite clay (optionally with other minor additives). The amount of smectite clay naturally occurring as a mixed additive in the kandite clay is desirably less than about 1%, especially less than about 0.5% by dry weight of the kandite clay.

As demonstrated hereinafter, the addition of the non-calcined smectite clay to the other components of Composition A beneficially raises the strength of the clay composition whilst retaining an improved casting rate compared with the unmodified kandite clay. Generally, as the ratio of smectite clay present to organic additive present is increased strength is increased whilst casting rate is decreased, and conversely, as the ratio of smectite clay present to organic additive present is decreased casting rate is increased whilst strength is decreased. This is demonstrated in the Examples later in this specification. The aforementioned ratio ranges represent the ranges in which a suitable balance is achieved between casting rate on the one hand and strength on the other hand. In some cases, unexpectedly, both casting rate and strength are improved compared with the results for the unmodified kandite clay.

Suitable smectite clays and organic additives for use in Composition A may be the monovalent ion activated smectites and cationic organic additives described earlier in this specification. The kandite clay of Composition A may comprise one or more of kaolinite, dickite, nacrite, and halloysite. "Kaolinite" includes kaolin type clays, ball clays, fire clays and china clays. Such clays occur in nature in which case they may contain small amounts of other minerals, eg. one or more of illite, mica, quartz and feldspar. Such naturally occurring materials may be used in Composition A. China clay is the preferred form of the kandite clay either alone or in combination with a ball clay.

Modified clays of Composition A may be prepared by an aqueous suspension of the kandite clay, preparing an aqueous suspension of the additive monovalent ion activated smectite clay and adding the suspension of the smectite clay and the organic additive to the suspension of the kandite clay. Conveniently, the suspension of the smectite clay may be added to the suspension of the kandite clay with stirring to form a uniform mixture followed by addition of the organic additive with stirring.

Alternatively, the smectite clay may be added together with the organic additive. The smectite clay may be coated with organic additive to form a single additive composition prior to addition to the kandite clay. Such an additive composition per se is novel.

According to the present invention in a third aspect there is provided a composition for improving a combination of the casting rate and strength of a kandite clay or a composition including a kandite clay which comprises a major amount of a monovalent ion activated smectite clay and a minor amount of an organic additive as defined hereinbefore. The weight ratio of the smectite clay present to the organic additive present may be as in the ranges specified for composition A hereinbefore. The composition may be formed by mixing an aqueous suspension of the additive monovalent ion smectite clay with the organic additive with stirring. The suspension formed may be added wet to the kandite clay as described hereinbefore. Alternatively, the smectite clay/organic additive mixture may be dried and transported for addition to the kandite clay at another location, eg. a slip production facility. A preferred alternative for forming the mixture of the smectite clay and organic additive is to mix the two in a dry state, eg. by milling.

The modified clay comprising composition A may be formulated at a slip production facility. It may be formulated in the preparation of a slip casting composition as described hereinafter. Alternatively, the modified clay of composition A may be prepared at a facility remote from the point of use.

In this case, the modified clay of composition A is preferably transported to a user, eg. a slip producer, in dry form. The mixed suspension formed as described hereinbefore may be dried in a known way, eg. by filter pressing and thermally drying, to a moisture content in the range of from 0.2% to 20% by weight, preferably in the range 5% to 15% by weight.

According to the present invention in a fourth aspect there is provided a clay composition for slip casting, ie. a slip casting composition which comprises:

a) composition A as described hereinbefore;

b) a slip medium.

The art of forming slip casting compositions is well known, and the skilled person will be well aware of the different types of liquid slip media available. Typically, however, the slip medium comprises water, although other liquid and solid ingredients may be included therein.

Other particulate materials conventionally used in slip casting may be present in the said slip casting composition according to the second aspect, in addition to composition A, such as quartz, nepheline syenite, and feldspar. Quartz and feldspars, including nepheline syenite, are described as "non-plastic" materials in whiteware ceramic systems. The have several functions. In the unfired state, they extend the overall particle size distribution of the ceramic clay body to larger sizes. This modifies the physical properties of the clay body by decreasing excessive plasticity and stickiness and reducing drying shrinkage, which would be a problem if the body contained only china clay and ball clay. Their presence also allows higher densities to be achieved in casting slips and improves cast permeability and hence casting rate.

On firing, the feldspars and nepheline syenite are sources of fluxing oxides ($K_2O$ and $Na_2O$) that promote the formation of the glassy phase that binds everything together. The quartz acts in part as a filler, but also modifies the thermal expansion properties of the body to ensure fault-free glazing.

Quartz and feldspars together may contribute between 40% and 60% by weight of the dry ceramic body recipe, depending on type and composition. Assuming a slip solids content of around 72.5% by weight, these figures equate to 29 and 43.5% of the weight of slip, respectively, although it is more usual to represent the amounts as percentages of the dry recipe rather than the total slip weight.

Typically, the kandite clay is present in an amount of at least 15%, eg. 15% to 30% by weight based on the weight of the slip casting composition. In Europe, it is common to use casting slips with a china clay (kaolin) content in the range 25–30% by weight of the dry recipe, but in the USA less china clay (kaolin) is used, generally in the range 17–25% by weight, but more ball clay.

In preparing the slip casting composition according to the fourth aspect of the present invention, it is normally necessary to use a dispersant. Typically, the dispersant used comprises sodium carbonate, a sodium silicate, sodium or ammonium polyacrylate, sodium tannate or sodium humate, or combinations thereof. Preferred is a sodium silicate.

The water-soluble organic additive present in the slip composition is normally present in an amount not greater than 1%, and normally in an amount not greater than 0.25% by weight. The amount chosen should be such as to increase the casting rate of the slip composition, but not so much as to adversely affect the rheology of the suspension.

The addition of a smectite clay to the slip casting composition in association with the presence of the organic additive in composition A enables the strength (and also the plasticity) of casts made from a slip containing the same to be increased whilst retaining a suitable slip casting rate in a manner similar to that described for composition A per se as described hereinbefore.

In the slip casting composition according to the third aspect, the composition may comprise an aqueous slip or slurry having a solids content of at least 65% by weight and incorporating china clay present to an extent of at least 15% by weight, eg. 15% to 30% by weight.

Slip casting using slip casting compositions according to the fourth aspect of the present invention may be carried out in a known way, eg. as described for the prior art hereinbefore.

According to the present invention in a fifth aspect there is provided a casting process for making a ceramic article comprising preparing a slip from a slip medium and a particulate material comprising clays, placing the slip into a mold, removing a portion of the slip medium from the mold, and recovering a cast part, said process being characterised by employing as the slip a slip casting composition according to the third aspect of the present invention.

DESCRIPTION OF EMBODIMENTS OF THE INVENTION

Embodiments of the present invention will now be described by way of example only with reference to the following Examples. In these Examples modified china clays which are examples of composition A were produced and their properties compared with the same china clays untreated or modified only with organic additive or smectite clay but not both. Slip casting compositions were then prepared from these various modified and unmodified china clays and investigated.

In these Examples, slip casting compositions were prepared in accordance with the following recipe:

| | |
|---|---|
| China clay, wt % | 28.5 |
| Ball clay, wt % | 25.0 |
| Quartz, wt % | 28.5 |
| Nepheline Syenite, wt % | 18.0 |

In these Examples, the china clay and ball clay contained less than 1% by weight of naturally occurring montmorillonite.

Slip Preparation

The slip compositions were prepared in the following manner.

A ball clay slip was first prepared by dispersing finely shredded ball clay in water with deflocculants (dispersants). A stirrer equipped with a tachometer and a device for recording the total amount of work done during the dispersion process is preferred. In each case the ball clay used was on a type specially selected for use in slip casting compositions. It had a casting concentration of 66.5% by weight and a particle size distribution such that 81% by weight consisted of particles having an equivalent spherical diameter (esd) smaller than 2 $\mu$m.

The amounts of ball clay and water are chosen so as to achieve a final solids content of the slip of 60 wt %. The water should contain a quantity of anhydrous sodium carbonate equivalent to a dose of 0.28 wt % on the weight of dry ball clay (ie. 0.07 wt % on the total dry body weight, assuming 25% ball clay in the body recipe).

The ball clay is added slowly to the water with vigorous stirring. As the ball clay is added, the viscosity of the slip increases and C100-grade sodium silicate solution is added incrementally to keep the slip fluid and stirrable. It is usually sufficient to add 0.1 wt % sodium silicate to the ball clay. This is equivalent to 0.025 wt % based on the final body weight, assuming a ball clay content of 25 wt % in the body. When all the ball clay has been added to the water, stirring is continued at 1000 rpm until the total amount of work done during dispersion reaches 7.5 kW-Hr/tonne.

The ball clay slip is then screened through a sieve of 125 μm aperture to remove coarse contaminants such as particles of fine sand or lignite. The slip is covered to prevent loss of water by evaporation, and allowed to stand unstirred for a minimum period of 16 hours, typically overnight.

The "body slip" is then prepared. Firstly, quantities of the various ingredients and water are calculated based on a final slip solids content of 74 wt % taking into account their moisture and solids contents. The required amounts of ball clay slip and water are mixed in the stirrer. The non-plastic components are then added, with increments of sodium silicate solution to maintain a fluid slip. Finally, the china clay is added, with more sodium silicate to bring the amount added during body dispersion to 0.075 wt %. Together with that added to the ball clay, this brings the total amount of sodium silicate to 0.1 wt % based on final dry body weight.

When all the ingredients have been added, stirring is continued at 1000 rpm until the total amount of work done during dispersion reaches 3.75 kW-Hr/tonne.

The slip is then covered and allowed to age overnight before testing.

Slip Testing

The slip is divided into several equal portions, normally three of four portions.

Slip density adjustment and deflocculant demand

The first portion is deflocculated by incremental additions of sodium silicate until the slip viscosity reaches a minimum value. This will normally be greater than 0.5 Pa.s. Water is then added in measured increments, with gentle stirring, until the slip viscosity is exactly 0.5 Pa.s. The density of this slip is then measured. The other portions of slip are now adjusted to the same density by adding the same amount of water to each as was added to the first portion. Small additions of sodium silicate are then made to these slips to give a set of slips with differing viscosities in the range 0.5 to 1.0 Pa.s. The amount of deflocculant (C100 sodium silicate) required to give a slip with a viscosity of 0.7 Pa.sec. is quoted as the deflocculant demand of the slip under evaluation.

Slip Thixotropy

The thixotropy (time dependent increase in viscosity) of each slip is measured using a Brookfield viscometer. The slip is first vigorously stirred for 30 seconds, and then placed under the viscometer, which is started immediately. The viscosity is noted at regular intervals up to sixty minutes, and a graph plotted of viscosity vs. time. The viscosity obtained after 60 minutes is referred to as the $V_{60}$ thixotropy.

Casting Rate

The casting rate of each slip is measured using small cylindrical plaster molds. The slip is first vigorously stirred for 30 seconds, and then poured into the mold and allowed to stand for a fixed time, typically 15 or 60 minutes. After this period the slip is poured out and the molds allowed to drain and dry, and the case removed. The thickness of the cast, in millimeters, is measured with a micrometer at several places around the circumference, and an average thickness calculated. The square of this value is then calculated and divided by the time allowed for casting, in minutes, to give a value of the casting rate in (millimeters)$^2$/minute.

The casting rate for each slip is then plotted against the $V_{60}$ thixotropy value for that slip, and a straight line drawn through the points. A casting rate is interpolated at a $V_{60}$ thixotropy of 5 Pa.s., and is quoted as the casting rate for the slip under evaluation.

Modulus of Rupture

The slips remaining after the casting rate and thixotropy test are bulked together. Cylindrical bars, 6 mm in diameter and 150 mm long, are cast using plaster molds. When the bars have cast solid, and have been allowed to dry in the air, they are removed from the molds and dried at 60° C. in an oven, overnight. The bars are then cut in half and placed in a controlled atmosphere of 80% relative humidity for several hours, before being broken on a three-point flexure jig with a 500 mm span mounted on a universal testing machine or similar equipment. The diameters of the bars are measured at the point of fracture, and the modulus of rupture calculated from the diameter and the force required to break the bar. At least ten bars are tested in this way, and the average modulus of rupture is calculated.

Plasticity

Test bars are prepared in the form of cast rods 6 mm in diameter, as for the modules of rupture test. However, unlike in that test, the cast bars are removed from the molds while still moist, approximately 20 to 25 minutes after the slip was first poured into the molds. By this time, the rods have cast solid and begun to shrink away from the mold. With care, it is possible to tap the mold and gently push out the cast rods. Slips that have a low shrinkage have to be left longer in the mold before they can be removed.

When the rods are removed from the mold they are quickly out in half, to give rods 75 mm long, and placed immediately into an atmosphere of 100% humidity, in for example a humidity cabinet, to prevent further loss of moisture.

The test bars are placed on a three point flexure jig, mounted on a universal testing machine. As the crosshead of the testing machine descends, an increasing load is applied to the centre of the bar, and the bar bends. At some point the bar breaks, and the load applied and the distance moved by the crosshead are recorded by the machine, either on a chart recorder or by the computer software.

When a bar has broken, the diameter of the bar is immediately measured at the point of fracture and the pieces are quickly placed in a pre-weighed weighing dish and the weight recorded. The dish is then put in a drying oven at 110° C. for several hours until the bars are dry, and the dry weight measured. The moisture content of the bars is calculated and expressed on a wet basis.

After the first few bars have been tested straight from the 100% humidity cabinet, bars may be allowed to dry in the air for a few minutes before testing. The drying period is progressively increased, to give bars with moisture contents extending from the maximum down to well below the critical moisture content (the moisture content at which contraction ceases). In some cases, overnight drying may be appropriate.

To evaluate the cast texture over the whole range of moisture contents requires a large number of measurements, typically up to 100, which can take several days. If data on cast plasticity is all that is required, it is only necessary to study test pieces over a range of moistures close to the maximum value, say in the range 15–20%. This reduces the number of measurements required to between 10 and 20.

It is convenient to use a spreadsheet to calculate and display the results. The data for each bar are entered into the spreadsheet, including wet and dry weights, bar diameters and the three measurements from the tensometer (load, strain and energy of fracture). The spreadsheet is then programmed to calculate the moisture content, cross sectional area and a module of rupture for each bar tested. The data can then be arranged in order of ascending moisture content.

Graphs of modulus of rupture, deflection at break and energy of fracture can be prepared as a function of moisture content. It will be found that the data is rather 'noisy', and it is convenient to smooth the data using a moving average technique over three data points, and discard the first and last results. Again, such a process is easily carried out in a spreadsheet.

From the graphs, the maximum deflection at break can be read off. It is convenient to refer to this value as the 'plasticity' of the cast pieces.

From experience and under testing conditions using 6 mm diameter bars, slips that give a maximum deflection at break of less than 2 mm can be described as brittle and would be very unlikely to give satisfactory casts. Slips that give a maximum deflection at break of between 2 and 2.5 mm are only slightly plastic, and are also unlikely to be satisfactory. Slips that give a maximum deflection at break of between 2.5 and 3 mm are quite plastic and are likely to be satisfactory in use. Slips that give a maximum deflection at break of greater than 3 mm are very plastic and will be very easy to trim and show little tendency to crack on drying.

The maximum deflection at break that can be achieved with any particular slip is very dependent on removing bars from the molds at the highest moisture content possible. This is a parameter that can be dependent on the skill of the operator in removing bars from the molds. It is advisable to have only one or two operators trained to do the test and to adopt a strict routine for casting and demolding the bars, otherwise data will not be comparable from slip to slip.

EXAMPLE 1

Four slip casting compositions were prepared according to the recipe referred to above. Each composition contained a different china clay as described below.

China clay R (comparative) was an untreated relatively fine china clay for ceramic purposes having the properties shown in Table 1 below:

China clay R1 (comparative) was prepared by treating china clay R with 2000 ppm (0.2% by weight, based on the weight of dry china clay) of a polyethylene amine (PEA) having a number average molecular weight of 309. The clay was first dispersed in water to provide a fluid suspension and the required dose of the PEA was then added with stirring. After stirring for a period of 30 minutes the treated clay was filtered and the filter cake dried at 60° C. to a moisture content of approximately 10%.

China clay R2 (invention) was prepared by treating china clay R with 2000 ppm of the same PEA as was used for clay R1 and 2% by weight, based on the weight of dry china clay, of a sodium activated bentonite (B1). A fluid suspension of the sodium activated bentonite was prepared by dispersing it in water. The required quantity of the bentonite suspension was added to the suspension of treated china clay with stirring. The mixture of china clay and bentonite was then treated with the required dose of PEA in the manner described for clay R1 above.

China clay R3 (invention) was prepared in exactly the same way as R2, except that 2% by weight, based on the weight of dry china clay, of a different sodium activated bentonite (B2) was used in place of bentonite B1.

The properties of the four china clays were measured by the procedures as described by the present assignee in its brochure published to customers, viz "Test Methods for Ceramic Products", ECC Brochure C076.

The properties of the four china clays are set forth in Table 1 below:

TABLE 1

| | China clay | | | |
|---|---|---|---|---|
| | R | R1 | R2 | R3 |
| Casting concentration (% by wt.) | 66.5 | 63.8 | 64.2 | 64.3 |
| Casting rate (mm² · min⁻¹) | 2.3 | 7.8 | 3.9 | 4.5 |

TABLE 1-continued

| | China clay | | | |
|---|---|---|---|---|
| | R | R1 | R2 | R3 |
| Deflocculant demand (wt. % P84 sodium silicate) | 0.55 | 0.35 | 0.30 | 0.35 |
| Modulus of rupture at 80% RH (MPa) | 0.44 | 0.22 | 0.62 | 0.48 |
| % by wt. smaller than 2 μm esd | 38 | 36 | 37 | 37 |

The four slip casting compositions were tested and were found to have the properties set out in Table 2 below:

TABLE 2

| | Slip casting composition containing china clay | | | |
|---|---|---|---|---|
| | R | R1 | R2 | R3 |
| Slip solids content (% wt.) | 73.8 | 74.0 | 73.5 | 73.1 |
| Slip defloculant demand (% wt.) | 0.17 | 0.12 | 0.16 | 0.15 |
| Modulus of rupture of cast bars at 80% RH (MPa) | 1.50 | 1.29 | 1.56 | 1.55 |
| Casting rate in plaster mold at 20° C. (mm² · min⁻¹) | 0.89 | 1.56 | 1.02 | 1.09 |
| Plasticity of cast bars (deflection to break) (mm) | 2.9 | 2.8 | 2.9 | 3.2 |

The results obtained for the slip casting composition containing treated china clay R1 show that, although the casting rate of the slip is greater, the casts made with it are weaker, compared with those made from the casting composition containing clay R. When treated china clay R2 or R3 is used in the casting composition, both the casting rate and the modulus of rupture have increased, as compared with the casting composition containing china clay R.

EXAMPLE 2

Three slip casting compositions were prepared according to the recipe referred to above. Such composition contained a different china clay as described below.

China clay L (comparative) was an untreated, relatively coarse china clay for ceramic purposes, which exhibits a faster casting rate, but lower strength than china clay R. Its properties are shown in Table 3 below:

China clay L1 (comparative) was prepared by treating china clay L with 2000 ppm of the same PEA, and by the same method, as were described above in connection with china clay R1.

China clay L2 (invention) was prepared by treating china clay L with 2000 ppm of the same PEA as was used for clay L1 and 2% by weight, based on the weight of dry china clay, of sodium activated bentonite B1 by the method described above in connection with china clay R2.

The properties of the three china clays were measured in the manner described as above and are forth in Table 3 below:

TABLE 3

| | China clay | | |
|---|---|---|---|
| | L | L1 | L2 |
| Casting concentration (% by wt.) | 67.2 | 63.8 | 62.6 |
| Casting rate (mm² · min⁻¹) | 4.7 | 11.6 | 8.7 |
| Deflocculant demand (wt. % P84 sodium | 0.40 | 0.35 | 0.25 |

TABLE 3-continued

|  | China clay | | |
|---|---|---|---|
|  | L | L1 | L2 |
| silicate) | | | |
| Modulus of rupture at 80% RH (MPa) | 0.28 | 0.14 | 0.39 |
| % by wt. smaller than 2 μm esd | 30 | 28 | 32 |

The three slip casting compositions were tested and were found to have the properties set out in Table 4 below:

TABLE 4

|  | Slip casting composition containing china clay | | |
|---|---|---|---|
|  | L | L1 | L2 |
| Slip solids content (% wt.) | 73.1 | 73.5 | 72.9 |
| Slip deflocculant demand (% wt.) | 0.14 | 0.10 | 0.13 |
| Modulus of rupture of cast bars at 80% RH MPa) | 1.41 | 1.13 | 1.46 |
| Casting rate in plaster molds at 20° C. (mm$^2 \cdot$ min$^{-1}$) | 1.22 | 1.85 | 1.38 |
| Plasticity of cast bars (deflection to break) (mm) | 2.2 | 2.2 | 2.3 |

It can be seen that the slip casting composition containing clay L1 has a faster casting rate but yields casts of severely diminished modulus of rupture, when compared with the composition containing clay L. The composition containing clay L2 provides both a faster casting rate and stronger casts when compared with the composition containing clay L.

EXAMPLE 3

A slip casting composition was prepared according to the recipe referred to above. The composition contained a china clay as described below:

China clay R4 (invention) was prepared by treating china clay R with 2000 ppm of a polyethylene imine (PEI) having a number average molecular weight of 1000 and 2% by weight, based on the weight of dry china clay, of sodium activated bentonite B2 by the method described above in connection with china clay R2.

The properties of the china clay in the manner described were measured as above and are set forth in Table 5 below:

TABLE 5

|  | China clay R4 |
|---|---|
| Casting concentration (% by wt.) | 64.2 |
| Casting rate (mm$^2 \cdot$ min$^{-1}$) | 6.2 |
| Deflocculant demand (wt. % P84 sodium silicate) | 0.45 |
| Modulus of rupture at 80% RH (MPa) | 0.42 |
| % by wt. smaller than 2 μm esd | 37 |

The slip casting composition was tested and was found to have the properties set out in Table 6 below. The results obtained for the slip casting composition containing china clay R from Example 1 are also included in the Table for comparison.

TABLE 6

|  | Slip casting composition containing china clay | |
|---|---|---|
|  | R4 | R |
| Slip solids content (% wt.) | 73.2 | 73.8 |
| Slip deflocculant demand (% wt.) | 0.15 | 0.17 |
| Modulus of rupture of cast bars at 80% RH (MPa) | 1.37 | 1.50 |
| Casting rate in plaster molds at 20° C. (mm$^2 \cdot$ min$^{-1}$) | 1.22 | 0.89 |
| Plasticity of cast bars (deflection to break) (mm) | 3.2 | 2.9 |

It can be seen that the slip casting compositions containing clay R4 has a faster casting rate and better plasticity when compared with the composition continuing clay R.

EXAMPLE 4

A sample of sodium activated bentonite B2 was treated with 10% by weight, based on the weight of dry bentonite, of the same PEA as was described in Example 1 above, by adding the required quantity of the PEA to the bentonite powder in a Janke and Kunkel laboratory rotating blade mill, and milling for approximately five minutes until the bentonite was free of lumps. The treated bentonite was then physically mixed with the same finely shredded ball clay as used in Examples 1 to 3 in the amount of 2.28% by weight of the treated bentonite, based on the weight of dry ball clay.

A Slip casting composition was prepared by the procedure described above, except that the ball clay, rather than the china clay, had been first treated with the bentonite. Also the amount of china clay (R) in the composition was reduced from 28.5 to 27.93% by weight, and the amount of the ball clay, with added bentonite, was increased from 25.0 to 25.57% by weight, to allow for the fact that the bentonite is now being added with the ball clay, rather than as a component of the china clay as in Examples 1 to 3. These proportions are such as to maintain the percentage of bentonite in the recipe at 0.57% by weight, as in Example 1.

The slip casting composition was tested as described above and was found to have the properties set forth in Table 7 below. The results obtained for the slip casting compositions containing china clays R and R3 are also included in Table 7 for comparison.

TABLE 7

|  | Slip casting composition containing | | |
|---|---|---|---|
|  | treated bentonite | china clay | |
|  |  | R | R3 |
| Slip solids content (% wt.) | 73.2 | 73.8 | 73.1 |
| Slip deflocculant demand (% wt.) | 0.19 | 0.17 | 0.15 |
| Modulus of rupture of cast bars at 80% RH (MPa) | 1.45 | 1.50 | 1.55 |
| Casting rate in plaster molds at 20° C. (mm$^2 \cdot$ min$^{-1}$) | 1.20 | 0.89 | 1.09 |
| Plasticity of cast bars (deflection to break) (mm) | 3.1 | 2.9 | 3.2 |

The method described in this Example provides a casting composition which has a slightly faster casting rate and gives casts of slightly lower modulus of rupture than the composition containing treated china clay R3. When the results for the composition of this Example are compared with those obtained for the composition containing untreated china clay R, it is seen that the casting rate and the cast plasticity have both increased, while the modulus of rupture of the casts is only slightly reduced.

EXAMPLE 5

Various china clay compositions were prepared optionally containing various amounts of additive sodium activated bentonite and/or PEA. The china clay, bentonite and PEA were all as used in Example 2. The casting concentration, casting rate and modulus of rupture of the various compositions were measured and the results obtained are shown in Table 8 as follows.

TABLE 8

| China clay, Bentonite and PEA Dose | Casting Conc. mass % | Casting Rate mm²/min. | Modulus of Rupture Kgf/cm² (80% RH) |
|---|---|---|---|
| China Clay L, no added bentonite | | | |
| 0 ppm PEA | 67.2 | 4.7 | 2.8 |
| 500 ppm PEA | 66.5 | 7.1 | 1.9 |
| 750 ppm PEA | 66.3 | 8.1 | 1.8 |
| 1000 ppm PEA | 66.0 | 8.6 | 1.8 |
| 2000 ppm PEA | 63.8 | 11.6 | 1.4 |
| China clay L + 2 mass % added bentonite | | | |
| 0 ppm PEA | 63.1 | 2.0 | 8.4 |
| 750 ppm PEA | 64.0 | 3.4 | 6.3 |
| 1000 ppm PEA | 64.1 | 4.1 | 5.6 |
| 1500 ppm PEA | 63.2 | 5.9 | 4.4 |
| 2000 ppm PEA | 62.6 | 8.7 | 3.9 |
| China clay L + 4 mass % added bentonite | | | |
| 0 ppm PEA | 59.8 | 0.7 | 14.1 |
| 750 ppm PEA | 61.9 | 1.6 | 11.1 |
| 1000 ppm PEA | 61.9 | 1.6 | 10.7 |
| 1500 ppm PEA | 61.5 | 2.7 | 9.2 |
| 2000 ppm PEA | 61.2 | 4.8 | 7.5 |

As is seen from Table 8, the modulus of rupture (measure of clay composition strength) is improved by adding either 2% or 4% (sodium activated) bentonite. This causes a reduction of the casting rate; however, in some cases where both PEA and bentonite are added the combination of casting rate and modulus of rupture is better than the combination of these two properties with one of these two additives missing.

EXAMPLE 6

Three china clay compositions as described in Table 9 below were prepared using china clay R used in Example 1. Properties measured for these compositions are as shown in Table 9 as follows.

TABLE 9

| Clay composition | Casting conc. mass % | Casting rate mm²/min | Modulus of rupture Kgf/cm² (80% RH) |
|---|---|---|---|
| China clay R 0 ppm PEA | 66.8 | 2.4 | 3.3 |
| China clay R + 2 mass % added monovalent ion bentonite 2000 ppm PEA | 64.1 | 4.1 | 5.8 |
| China clay R + 4 mass % added monovalent ion bentonite 2000 ppm PEA | 62.5 | 1.9 | 9.5 |

As seen in Table 9, the casting rate and modulus of rupture can be improved by adding 2000 ppm PEA and 2% bentonite. The modulus of rupture can be further improved by increasing the added bentonite amount to 4% at the expense of the casting rate.

Casting rate and modulus of rupture of slip compositions made using the clay compositions listed in Tables 8 and 9 generally show a similar variation.

We claim:

1. A method of producing a slip casting composition which comprises adding to a slip casting medium a clay composition comprising (a) a kandite clay; (b) an organic additive comprising a water soluble compound having a plurality of basic groups, the organic additive being present in an amount of from about 0.05% to about 0.5% based on the dry weight of the kandite clay and (c) monovalent ion activated smectite clay present in an amount of from about 2% by weight to about 5% by weight based on the dry weight of the kandite clay.

2. A method as claimed in claim 1 and wherein the kandite clay contains a natural impurity level of smectite clay of not more than about 1% by weight based on the dry weight of the kandite clay and monovalent ion activated smectite clay is added to the kandite clay.

3. A method as claimed in claim 2 and wherein the kandite clay or clays forms from about 92% to about 99% by weight of the kandite clay composition.

4. A method as claimed in claim 2 and wherein the eight ratio of the added monovalent ion activated smectite clay to the organic additive is in the range from about 3:1 to about 30:1.

5. A method as claimed in claim 1 and wherein the kandite clay comprises kaolin clay optionally together with ball clay.

6. A method as claimed in claim 1 and wherein the organic additive comprises an alkylene amine or a poly (alkyleneamine).

7. A method as claimed in claim 1 and wherein the added smectite clay comprises sodium activated bentonite.

8. A method as claimed in claim 1 and wherein the slip medium comprises water.

9. A method as claimed in claim 8 and wherein the slip casting composition additionally includes one or more ingredients selected from quartz, nepheline cyenite and feldspar.

10. A method as claimed in claim 8 and wherein the composition formed in the method comprises an aqueous slip or slurry having a solids content of at least 65% by weight and incorporates china clay present to an extent of at least 15% by weight.

11. A casting method for making a ceramic article comprising preparing a slip from a slip medium and a particulate material comprising clays, placing the slip into a mold, removing a portion of the slip medium from the mold, and recovering a cast part, the slip being a slip casting composition produced by the method of claim 8.

* * * * *

UNITED STATES PATENT AND TRADEMARK OFFICE
CERTIFICATE OF CORRECTION

PATENT NO. : 5,972,263
DATED : October 26, 1999
INVENTOR(S) : H. GOODMAN et al.

It is certified that error appears in the above-identified patent and that said Letters Patent is hereby corrected as shown below:

Claim 4, col. 16, line 41, change "eight" to read --weight--.

Signed and Sealed this

Sixteenth Day of May, 2000

Attest:

Q. TODD DICKINSON

Attesting Officer     Director of Patents and Trademarks